United States Patent
McGrath et al.

(10) Patent No.: US 12,444,503 B2
(45) Date of Patent: Oct. 14, 2025

(54) METHODS AND SYSTEMS FOR ESTIMATING CAUSAL EFFECTS FROM KNOWLEDGE GRAPHS

(71) Applicant: Accenture Global Solutions Limited, Dublin (IE)

(72) Inventors: Rory McGrath, County Kildare (IE); Luca Costabello, Newbridge (IE); Christophe Gueret, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 840 days.

(21) Appl. No.: 17/731,590

(22) Filed: Apr. 28, 2022

(65) Prior Publication Data
US 2022/0367051 A1    Nov. 17, 2022

Related U.S. Application Data

(60) Provisional application No. 63/188,689, filed on May 14, 2021.

(51) Int. Cl.
| | | |
|---|---|---|
| G06N 20/00 | (2019.01) | |
| G06N 5/02 | (2023.01) | |
| G16H 50/20 | (2018.01) | |

(52) U.S. Cl.
CPC ............ *G16H 50/20* (2018.01); *G06N 5/02* (2013.01)

(58) Field of Classification Search
CPC ......... G16H 50/20; G16H 70/00; G06N 5/02; G06N 3/08; G06N 3/042; G06N 3/045; G06N 5/022
See application file for complete search history.

(56) References Cited

U.S. PATENT DOCUMENTS

| | | | | |
|---|---|---|---|---|
| 11,636,949 B2 * | 4/2023 | Goldberg | ............... | G16H 20/00 705/3 |
| 2015/0317337 A1 * | 11/2015 | Edgar | .................... | G16H 50/70 707/751 |

(Continued)

OTHER PUBLICATIONS

Guo, Ruocheng, Jundong Li, and Huan Liu. "Learning individual causal effects from networked observational data." Proceedings of the 13th international conference on web search and data mining. 2020 (Year: 2020).*

(Continued)

*Primary Examiner* — Andrew T McIntosh
(74) *Attorney, Agent, or Firm* — Polsinelli PC

(57) ABSTRACT

Methods and systems for estimating causal effects from knowledge graphs are provided. The method includes obtaining intervention application data and subject history data for a candidate group of subjects, and dividing, based on the intervention application data, the candidate group into a reception subgroup that received an intervention and a rejected subgroup that did not receive the intervention. The method includes for each subject within the candidate group, mapping, based on the subject history data, a covariate value set onto a knowledge graph with an embedding neural network; and for each subject in the reception subgroup or the rejection subgroup, translating the covariate value sets for the subjects within the reception subgroup or the rejection subgroup into a reception matrix or a rejection matrix with a feature neural network. The method includes comparing the reception subgroup to the rejection subgroup to determine a differential intervention effect.

20 Claims, 17 Drawing Sheets

(56) References Cited

U.S. PATENT DOCUMENTS

| | | | |
|---|---|---|---|
| 2016/0292248 A1* | 10/2016 | Garcia | G06Q 10/063 |
| 2017/0337345 A1* | 11/2017 | Pauws | G16H 50/20 |
| 2021/0287800 A1* | 9/2021 | Ghosh | G16H 10/60 |
| 2022/0093259 A1* | 3/2022 | Li | G16H 10/60 |
| 2022/0188659 A1* | 6/2022 | Krasnoslobodtsev | G16H 70/40 |
| 2022/0261668 A1* | 8/2022 | Stumpe | G06F 16/284 |
| 2022/0301716 A1* | 9/2022 | Kano | G16H 10/60 |
| 2022/0375622 A1* | 11/2022 | Gnanasambandam | G16H 15/00 |
| 2022/0384052 A1* | 12/2022 | Gnanasambandam | G16H 40/20 |
| 2022/0391270 A1* | 12/2022 | Gnanasambandam | G16H 20/70 |
| 2022/0391730 A1* | 12/2022 | Gnanasambandam | G06N 5/043 |

OTHER PUBLICATIONS

Yazdani, Afsaneh, and Eric Boerwinkle. "Causal inference in the age of decision medicine." Journal of data mining in genomics & proteomics 6.1 (2014): 163 (Year: 2014).*

Dahabreh, Issa J., Rodney Hayward, and David M. Kent. "Using group data to treat individuals: understanding heterogeneous treatment effects in the age of precision medicine and patient-centred evidence." International journal of epidemiology 45.6 (2016): 2184-2193 (Year: 2016).*

Kalisch, Markus, et al. "Causal inference using graphical models with the R package pcalg." Journal of statistical software 47 (2012): 1-26 (Year: 2012).*

* cited by examiner

180

| for each subject within the candidate group, applying the corresponding reception matrix or the corresponding rejection matrix to a likelihood neural network trained to determine an intervention application likelihood for the subject based on the covariate value set, | 181 |

| applying the intervention matrix to an effect neural network trained to return an effect for subjects with same intervention application status, to obtain an intervention effect, | 182 |

| applying the non-intervention matrix to the effect neural network, to obtain a non-intervention effect, | 183 |

| subtracting the non-intervention effect from the intervention effect with accounting for the intervention application likelihood for the subjects, to obtain the differential intervention effect | 184 |

--- applying, to the effect neural network, a current status matrix of a test subject with a pending intervention determination to obtain a forecasted intervention effect for the test subject;  191

↓ comparing the forecasted intervention effect to the differential intervention effect;  192

↓ in response to the forecasted intervention effect exceeding the differential intervention effect, outputting an indication for the intervention for the test subject.  193

FIG. 1C

| sample_id | dob_mm | dob_wk | bfacil | ubfacil | bfacil3 | mager41 |
|---|---|---|---|---|---|---|
| 1481529 | 11 | 7 | | | | 21 |
| 311677 | 3 | 3 | | 1 | 1 | 25 |
| 1225695 | 11 | 7 | | 1 | 1 | 27 |
| 854512 | 2 | 5 | | 1 | 1 | 31 |
| 3023123 | 7 | 6 | | 1 | 1 | 29 |
| 3345991 | 8 | 4 | | 1 | 1 | 29 |
| 3366361 | 9 | 6 | | 1 | 1 | 22 |
| 3925966 | 9 | 1 | | 1 | 1 | 32 |
| 1316042 | 6 | 1 | | 1 | 1 | 28 |
| 1012233 | 11 | 4 | | 1 | 1 | 32 |
| 3859849 | 3 | 4 | | 1 | 1 | 22 |
| 2394349 | 2 | 1 | | 1 | 1 | 28 |
| 1685597 | 6 | 5 | | 1 | 1 | 34 |
| 1450156 | 7 | 4 | | 1 | 1 | 27 |
| 2422955 | 2 | 5 | | 1 | 1 | 22 |
| 1034456 | 12 | 1 | | 1 | 1 | 37 |
| 1738390 | 3 | 4 | | 1 | 1 | 33 |
| 3847121 | 1 | 1 | | 1 | 1 | 30 |
| 2804094 | 12 | 4 | | 1 | 1 | 24 |
| 1553852 | 5 | 5 | | 1 | 1 | 34 |
| 2142202 | 3 | 1 | | 1 | 1 | 34 |
| 2948475 | 10 | 7 | | 1 | 1 | 34 |

FIG. 4A

| sample_id | mager14 | mager9 | restatus | mbrace | mracerec | umhisp |
|---|---|---|---|---|---|---|
| 1481529 | 8 | 3 | 2 | 1 | 1 | 0 |
| 311677 | 9 | 4 | 1 | 1 | 1 | 1 |
| 1225695 | 9 | 4 | 2 | 1 | 1 | 0 |
| 854512 | 10 | 5 | 1 | 1 | 1 | 0 |
| 3023123 | 9 | 4 | 1 | 1 | 1 | 1 |
| 3345991 | 9 | 4 | 1 | 1 | 1 | 0 |
| 3366361 | 8 | 3 | 2 | 1 | 1 | 1 |
| 3925966 | 10 | 5 | 1 | 2 | 2 | 0 |
| 1316042 | 9 | 4 | 1 | 1 | 1 | 0 |
| 1012233 | 10 | 5 | 1 | 2 | 2 | 3 |
| 3859849 | 8 | 3 | 1 | 1 | 1 | 0 |
| 2394349 | 9 | 4 | 1 | 14 | 4 | 0 |
| 1685597 | 10 | 5 | 1 | 1 | 1 | 0 |
| 1450156 | 9 | 4 | 1 | 1 | 1 | 0 |
| 2422955 | 8 | 3 | 1 | 2 | 2 | 0 |
| 1034456 | 11 | 6 | 2 | 2 | 2 | 0 |
| 1738390 | 10 | 5 | 2 | 1 | 1 | 5 |
| 3847121 | 10 | 5 | 3 | 1 | 1 | 0 |
| 2804094 | 8 | 3 | 1 | 1 | 1 | 0 |
| 1553852 | 10 | 5 | 1 | 1 | 1 | 0 |
| 2142202 | 10 | 5 | 1 | 2 | 2 | 0 |
| 2948475 | 10 | 5 | 1 | 2 | 2 | 9 |

METHODS AND SYSTEMS FOR ESTIMATING CAUSAL EFFECTS FROM KNOWLEDGE GRAPHS

RELATED APPLICATION

The present application claims the benefit of U.S. Provisional Application No. 63/188,689 filed on May 14, 2021, which is incorporated by reference in its entirety.

FIELD OF THE INVENTION

The present disclosure relates in general to the fields of knowledge graphs, in particular to methods and systems for neural-network-based comparative analysis to determine causal effects from knowledge graphs.

BACKGROUND

Rapid advances in electronics and communication technologies, driven by immense customer demand, have resulted in the widespread adoption of communication technology supported services. As one example, communications-based tracking and support of medical products and services has transformed the medical industry. Improvements in the integration of communication-based technologies into service support will continue to increase the features and options available to service customers and providers of services.

Data stored in a knowledge graph format is organized to reflect relations between specific concepts within the knowledge graph. Traditional approaches in the field of causal inference may be limited in their scope and low in efficiency and/or accuracy.

Machine learning models may be used to provide a casual estimation based on an existing knowledge graph. The machine learning process for estimating casual effects from the knowledge graph may be optimized and improved towards a more efficient system.

SUMMARY

The present disclosure relates to methods, apparatus, and non-transitory computer readable storage medium for estimating casual effects from knowledge graphs.

The present disclosure describes a computing device for estimating causal effects from knowledge graphs. The computing device includes a network interface circuitry configured to obtain intervention application data and obtain subject history data for a candidate group of subjects; and an intervention circuitry configured to execute an intervention stack. At a classification tier of the intervention stack, based on the intervention application data, the intervention circuitry is configured to divide the candidate group into a reception subgroup that received an intervention and a rejected subgroup that did not receive the intervention. At a knowledge tier of the intervention stack, for each subject within the candidate group, based on the subject history data, the intervention circuitry is configured to map a covariate value set onto a knowledge graph with an embedding neural network, the covariate value set having a modeled functional relationship to selection for intervention. At a matrix tier of the intervention stack, the intervention circuitry is configured to: for each subject in the reception subgroup, translate the covariate value sets for the subjects within the reception subgroup into a reception matrix with a feature neural network, for each subject in the rejection subgroup, translate the covariate value sets for the subjects within the rejection subgroup into a rejection matrix with the feature neural network, compile reception matrices into an intervention matrix, and compile rejection matrices into a non-intervention matrix. And at a neural tier of the intervention stack, the intervention circuitry is configured to compare the reception subgroup to the rejection subgroup to determine a differential intervention effect by: for each subject within the candidate group, applying the corresponding reception matrix or the corresponding rejection matrix to a likelihood neural network trained to determine an intervention application likelihood for the subject based on the covariate value set, to obtain an intervention effect, applying the intervention matrix to an effect neural network trained to return an effect for subjects with same intervention application status, to obtain a non-intervention effect, applying the non-intervention matrix to the effect neural network, and subtracting the non-intervention effect from the intervention effect with accounting for the intervention application likelihood for the subjects, to obtain the differential intervention effect.

The present disclosure describes a method for estimating causal effects from knowledge graphs. The method includes obtaining, by a network interface circuitry, intervention application data and subject history data for a candidate group of subjects; dividing, by an intervention circuitry based on the intervention application data, the candidate group into a reception subgroup that received an intervention and a rejected subgroup that did not receive the intervention. For each subject within the candidate group, mapping, by the intervention circuitry based on the subject history data, a covariate value set onto a knowledge graph with an embedding neural network, the covariate value set having a modeled functional relationship to selection for intervention. For each subject in the reception subgroup, translating, by the intervention circuitry, the covariate value sets for the subjects within the reception subgroup into a reception matrix with a feature neural network. For each subject in the rejection subgroup, translating, by the intervention circuitry, the covariate value sets for the subjects within the rejection subgroup into a rejection matrix with the feature neural network. Compiling, by the intervention circuitry, reception matrices into an intervention matrix. Compiling, by the intervention circuitry, rejection matrices into a non-intervention matrix. And comparing, by the intervention circuitry, the reception subgroup to the rejection subgroup to determine a differential intervention effect by: for each subject within the candidate group, applying the corresponding reception matrix or the corresponding rejection matrix to a likelihood neural network trained to determine an intervention application likelihood for the subject based on the covariate value set, applying the intervention matrix to an effect neural network trained to return an effect for subjects with same intervention application status, to obtain an intervention effect, applying the non-intervention matrix to the effect neural network, to obtain a non-intervention effect, and subtracting the non-intervention effect from the intervention effect with accounting for the intervention application likelihood for the subjects, to obtain the differential intervention effect.

The present disclosure describes a non-transitory computer-readable storage medium storing computer-readable instructions. The computer-readable instructions, when executed by a processor, are configured to cause the processor to perform: obtaining intervention application data and subject history data for a candidate group of subjects; dividing, based on the intervention application data, the candidate group into a reception subgroup that received an intervention and a rejected subgroup that did not receive the intervention. For each subject within the candidate group, mapping, based on the subject history data, a covariate value set onto a knowledge graph with an embedding neural network, the covariate value set having a modeled functional relationship to selection for intervention. For each subject in the reception subgroup, translating the covariate value sets for the subjects within the reception subgroup into a reception matrix with a feature neural network. For each subject in the rejection subgroup, translating the covariate value sets for the subjects within the rejection subgroup into a rejection matrix with the feature neural network. Compiling reception matrices into an intervention matrix. Compiling rejection matrices into a non-intervention matrix. And comparing the reception subgroup to the rejection subgroup to determine a differential intervention effect by: for each subject within the candidate group, applying the corresponding reception matrix or the corresponding rejection matrix to a likelihood neural network trained to determine an intervention application likelihood for the subject based on the covariate value set, applying the intervention matrix to an effect neural network trained to return an effect for subjects with same intervention application status, to obtain an intervention effect, applying the non-intervention matrix to the effect neural network, to obtain a non-intervention effect, and subtracting the non-intervention effect from the intervention effect with accounting for the intervention application likelihood for the subjects, to obtain the differential intervention effect.

The present disclosure also describes a system including circuitry configured to implement any of the above methods.

The present disclosure also describes a product manufactured by any of the above methods.

In the present disclosure, an intervention may refer to a particular treatment; intervention application data may include data indicating whether a subject received an intervention or not; a candidate group of subjects may include a plurality of subjects/patients, some of which received the intervention, and some of which did not receive the intervention; an intervention effect may include an estimated treatment effect for subjects/patients receiving the intervention (or the particular treatment); and a non-intervention effect may include an estimated treatment effect for subjects/patients not receiving the intervention (or the particular treatment).

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 1B is another flow diagram illustrating an example of a method implemented by an exemplary system, in accordance with certain embodiments of the present disclosure.

FIG. 1C is another flow diagram illustrating an example of a method implemented by an exemplary system, in accordance with certain embodiments of the present disclosure.

FIG. 4A is an exemplary portion of a spreadsheet or data table, in accordance with certain embodiments of the present disclosure.

FIG. 4B is another exemplary portion of a spreadsheet or data table, in accordance with certain embodiments of the present disclosure.

DETAILED DESCRIPTION

Figure 1A:
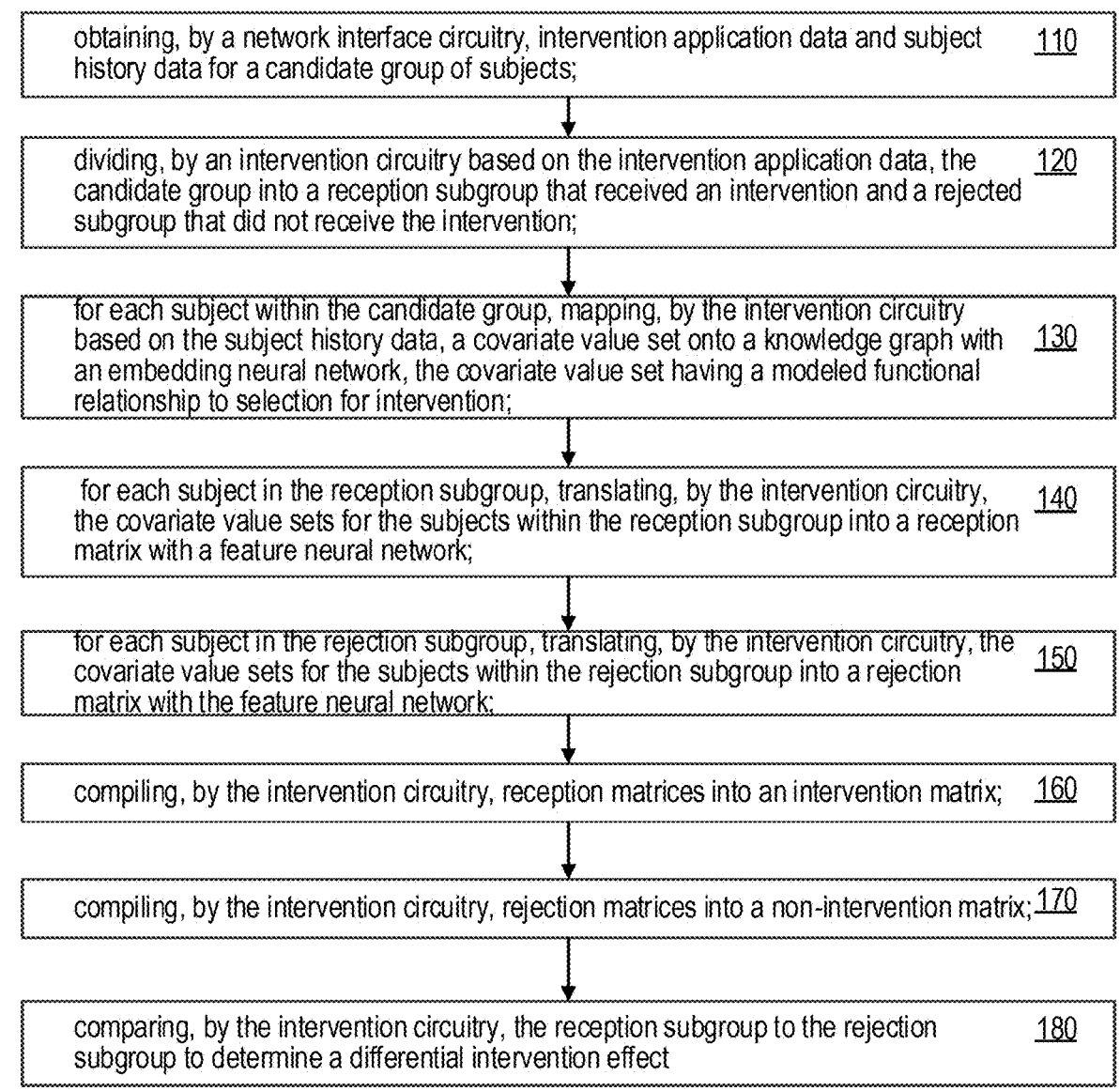
FIG. 1A is a flow diagram illustrating an example of a method implemented by an exemplary system, in accordance with certain embodiments of the present disclosure.

Reference will now be made in detail to the embodiments of the present disclosure, examples of which are illustrated in the accompanying drawings, which form a part of the present disclosure, and which show, by way of illustration, specific examples of embodiments. Please note that the disclosure may, however, be embodied in a variety of different forms and therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, application program interface (API), firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure may be embodied in various forms, including a system, a method, a computer readable medium, or a platform-as-a-service (PaaS) product for estimating causal effects from knowledge graphs (KGs). In various examples/embodiments, a machine learning system may, based on one or more knowledge graphs, estimate causal effects of a treatment on a desired outcome.

As a non-limiting example, the present disclosure may be applied to provide a solution to a problem of "does a specific type of chemotherapy have a positive, causal effect on cancer relapse?" Some embodiments may include a system that uses a graph database of clinical data on lung cancer patients as input, and generate a result, e.g. "in average, chemotherapy type 0 has a positive, causal effect on patient relapse," as output.

A knowledge graph may include a set of entities and relations (links) between these entities represented as a graph. A model for a knowledge graph may be defined by a schema or layout that describes the data structures and their relationships, which may be represented by nodes and edges in the knowledge graph. The knowledge graph may present complex and innovative graphical structures that represent the relevant information in response to a query. In various embodiments, the knowledge graph may represent an underlying knowledge base via graphical representations that correspond to structured data points or entities (represented by nodes), relationships (represented by edges), and/or attributes (represented by node properties or edge properties) with semantic meaning.

The knowledge graph may include one or more graph-based datasets. The graph-based datasets may be stored in the memory and include associations of the corresponding two nodes, for example, a graph-based dataset may include an association of the first node and the second node. In one implementation, a graph-based dataset may include data records having three parameters, which may be known as a triple: a first entity, a relation, and a second entity, and may be represented as <first entity, relation, second entity>. In another implementation, a triple may include a subject, a predicate, and an object. The predicate represents a relationship between the subject and the object. The triple may be represented as <subject, predicate, object>.

For example, a predicate "HasRelapse" may represent an association between a subject representing a "patient" and an object representing a "relapse." For another example, a predicate "therapyType" may represent an association between a subject representing a "relapse" and an object representing a "PalliativeCare." For another example, a predicate "causes" may represent an association between a subject representing a "gene" and an object representing a "disease." For another example, a predicate "born on" may represent an association between a subject representing a person's name "Jack" and an object representing a month name "January" as in <Jack, born on, January>.

In some implementations, causal inference may be developed in areas with high stakes, for example, in the medical domain to deal with decisions that may have a lasting and significant impact on an individual's health or even life. In some scenarios, there may be a regression model that revolves around a treatment. In the medical domain, a new treatment may be investigated for a certain ailment. Without losing generality, an investigation of how well a new treatment for hereditary type 2 diabetes works may be taken as an example and described below.

For the treatment for hereditary type 2 diabetes, there may be a set of 1000 patients: about half of them may receive the treatment (or intervention), who may be a reception subgroup; and about half may not receive the treatment, who may be a rejection group. For each patient in the reception subgroup, the treatment is administrated and how well or poorly the patient responds is recorded. For each patient in the rejection group, how well or poorly the condition is for the patient may also be recorded.

In some implementations, the individual treatment response along with other potential compounding details may be saved in an excel sheet and is processed by various neural networks to predict how well a specific individual responds to a treatment and how well the general population responds to the treatment. FIGS. 4A and 4B shows an exemplary spreadsheet (410 and 420), wherein sample_id 412 may be an identifier for each patient, and other columns may represent the individual's treatment response, and other potential compounding details (e.g., history data) for each patient, for example, a column 414 may be a month of a date_of_birth for each patient. The spreadsheet (410 and 420) may include a common-separated value (CSV) file.

Figure 4C:
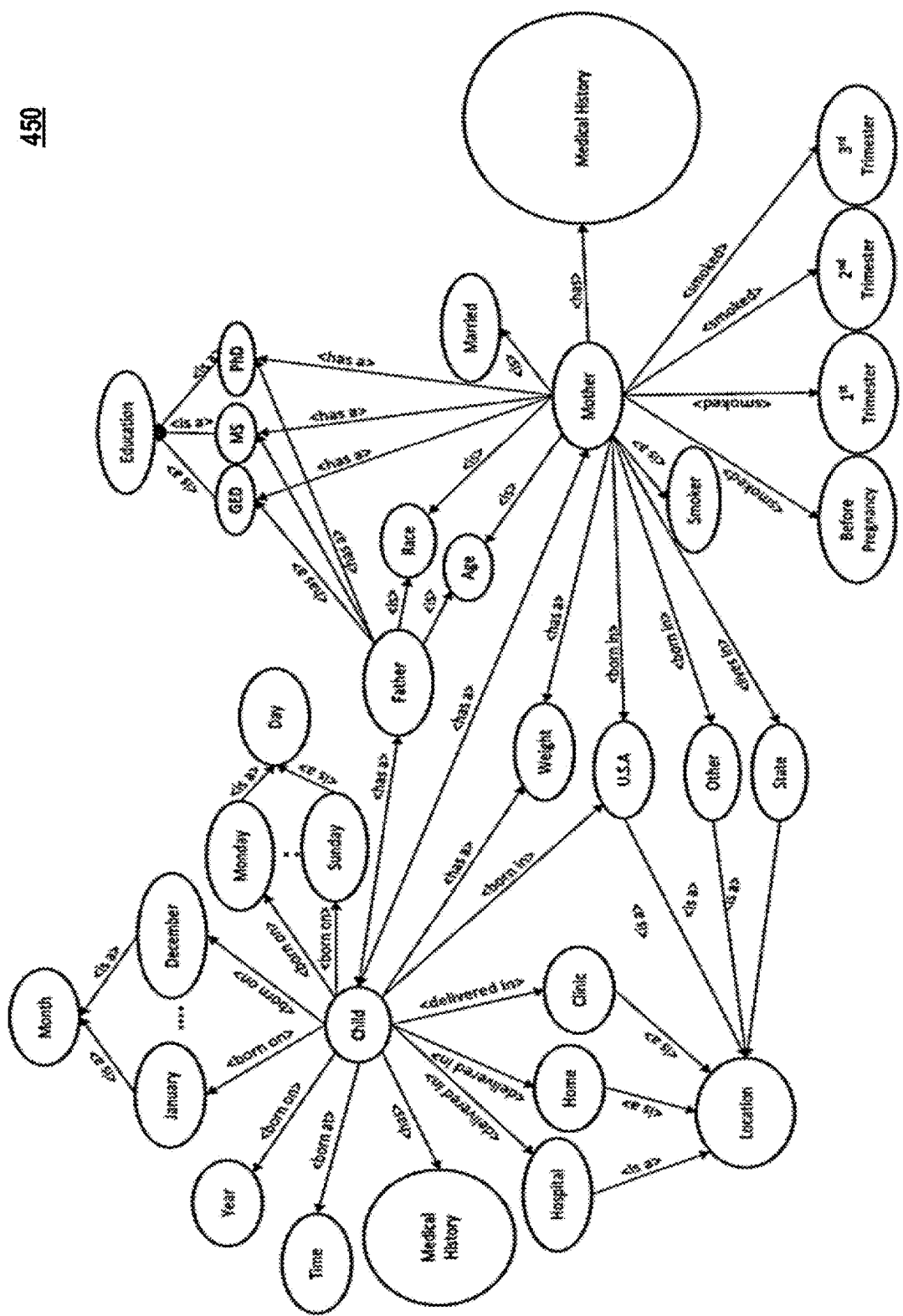
FIG. 4C is an exemplary portion of a knowledge graph, in accordance with certain embodiments of the present disclosure.

In some implementations, the individual's treatment response along with other potential compounding details may be saved and represented by one or more knowledge graph and is processed by various neural networks to predict how well a specific individual responds to a treatment and how well the general population responds to the treatment. FIG. 4C shows an exemplary knowledge graph (450), which includes/represents the individual treatment response along with other potential compounding details.

In some implementations, there may be some general assumptions for modelling the data. For example, one of the general assumptions may be that the history/treatment data may be assumed a 'no hidden confounder' setting. Another assumption may be that a structural causal model (SCM) may be assumed for the data.

In some implementations, one or more deep neural networks (DNNs) may be used to estimate individual treatment effect, and a neural architecture may be used to help estimate an individual treatment effect. The DNNs may be trained with a training data set to approximate the function of estimating individual treatment effect.

In some implementations, a three-headed architecture (e.g., a 'Dragonnet' model) may be used to provide an end-to-end procedure for predicting propensity score and conditional outcome from covariates and treatment information. In some other implementations, similar to the method above, the three-headed architecture may also be used for targeted regularization to mitigate finite-sample instability.

In some implementations, one or more neural networks may be adapted for the estimation of treatment effects. For example, another architecture may be used to focus on estimation of treatment effects based on tabular data. In some implementations, learning from graph data may be performed.

In some implementations, text embeddings may be adapted for causal inference. Some implementations may include creating word embeddings that take causality into account. Some implementations may include reducing a corpus of text to a low-dimensional representation that suffices for causal identification. Some implementations may focus on a corpus of text but not graph data.

In some implementations, causal-effect inference failure may be identified with uncertainty-aware models. Some implementations may include using uncertainty aware models to develop a principled approach to modeling outcome uncertainty in individual-level causal effect estimates. Some implementations may lead to more accurate identification of cases wherein accurate predictions may not be expected. Some implementations may not deal with graph data.

The present disclosure describes various embodiments for a method and/or a system that, given a knowledge graph, estimates the causal effect of a treatment on a desired outcome.

Referring to FIG. 1A, a method 100 may include a portion or all of the following steps: Step 110—obtaining, by a network interface circuitry, intervention application data and subject history data for a candidate group of subjects; Step 120—dividing, by an intervention circuitry based on the intervention application data, the candidate group into a reception subgroup that received an intervention and a rejected subgroup that did not receive the intervention; Step 130—for each subject within the candidate group, mapping, by the intervention circuitry based on the subject history data, a covariate value set onto a knowledge graph with an embedding neural network, the covariate value set having a modeled functional relationship to selection for intervention; Step 140, for each subject in the reception subgroup, translating, by the intervention circuitry, the covariate value sets for the subjects within the reception subgroup into a reception matrix with a feature neural network; Step 150—for each subject in the rejection subgroup, translating, by the intervention circuitry, the covariate value sets for the subjects within the rejection subgroup into a rejection matrix with the feature neural network; Step 160—compiling, by the intervention circuitry, reception matrices into an intervention matrix; Step 170—compiling, by the intervention circuitry, rejection matrices into a non-intervention matrix; and/or Step 180—comparing, by the intervention circuitry, the reception subgroup to the rejection subgroup to determine a differential intervention effect.

The method 100 may be implemented and performed by improving the operation of a computer in achieving a machine learning process and obtaining more accurate results, thus improving one or more prospects for an application of determining causal effects from knowledge graphs. For example, the method may be directed to improving the accuracy of a solution to a problem of "does a specific type of chemotherapy has a positive, causal effect on cancer relapse?" and the method may output a result, e.g. "in average, chemotherapy type 0 has a positive, causal effect on patient relapse." In some implementations, the method may further include training a machine learning model to obtain an improved machine learning model, which may generate causal effects with greater accuracy and improved reliability.

In some implementations, a covariate value set onto a knowledge graph may correspond to one or more embedding vectors of entities and relations in the knowledge graph, as in an embedded representation of the knowledge graph.

In some implementations, referring to FIG. 1B, step 180 may include a portion or all of the following steps: Step 181—for each subject within the candidate group, applying the corresponding reception matrix or the corresponding rejection matrix to a likelihood neural network trained to determine an intervention application likelihood for the subject based on the covariate value set; Step 182—applying the intervention matrix to an effect neural network trained to return an effect for subjects with same intervention application status, to obtain an intervention effect; Step 183—applying the non-intervention matrix to the effect neural network, to obtain a non-intervention effect; and/or Step 184—subtracting the non-intervention effect from the intervention effect with accounting for the intervention application likelihood for the subjects, to obtain the differential intervention effect.

In some implementations, the likelihood neural network and the effect neural network are included within a single neural network.

In some implementations, the knowledge graph includes an edge that extends from a first node representing a first entity to a second node representing a second entity; and/or the edge represents at least one of the following: a child relationship, a descendant relationship, or an association relationship between the first node and the second node. The association relationship may be a relationship other than child and descendant relationship, for example, for "a patient has an age of 65" may be represented in the graph as two nodes "Patient" and "age 65" with the edge being "has age", wherein the two nodes "Patient" and "age 65" have no implied child or descendant relationship.

In some implementations, the knowledge graph includes at least one of a directed acyclic graph (DAG), a resource description framework (RDF), and/or other knowledge graph type.

In some implementations, the intervention comprises a medical treatment.

In some implementations, the knowledge graph and the mapped covariate value set may be used to train a deep neural network once the knowledge graph is created and the embeddings are generated.

In some implementations, the subject history data comprises an indication of one or more symptoms present at a time of intervention application determination for the subjects in the candidate group.

In some implementations, referring to FIG. 1C, the method 100 may further include a portion or all of the following steps: Step 191—applying, to the effect neural network, a current status matrix of a test subject with a pending intervention determination to obtain a forecasted intervention effect for the test subject; Step 192—comparing the forecasted intervention effect to the differential intervention effect; and/or Step 193—in response to the forecasted intervention effect exceeding the differential intervention effect, outputting an indication for the intervention for the test subject.

In some implementations, the likelihood neural network is trained using a graph embedding used to represent covariate relationships on the knowledge graph.

In some implementations, the graph embedding includes a tuple representation of graph data from the knowledge graph.

In some implementations, when the edge represents a child relationship, the edge indicates that the first entity caused the second entity. When the edge represents a descendant relationship, the edge indicates that the second entity caused the first entity. And/or when the edge represents an association relationship, the edge indicates that the first entity is associated or has a property of the second entity.

In some implementations, the step 110 may include establishing localized instantiation of the intervention circuitry at a storage location of the subject history data. In some implementations, the establishing localized instantiation of the intervention circuitry may include execution of privacy protocols for the subject history data.

In some embodiments, one or more neural networks may be implemented to include the functions of at least one of the following neural networks: the embedding neural network, the likelihood neural network, the feature neural network, and/or the effect neural network. For example, one embodiment may include a single neural network, which is a combination of the embedding neural network, the likelihood neural network, the feature neural network, and the effect neural network, and serves the functions of the embedding neural network, the likelihood neural network, the feature neural network, and the effect neural network.

Figure 2A:
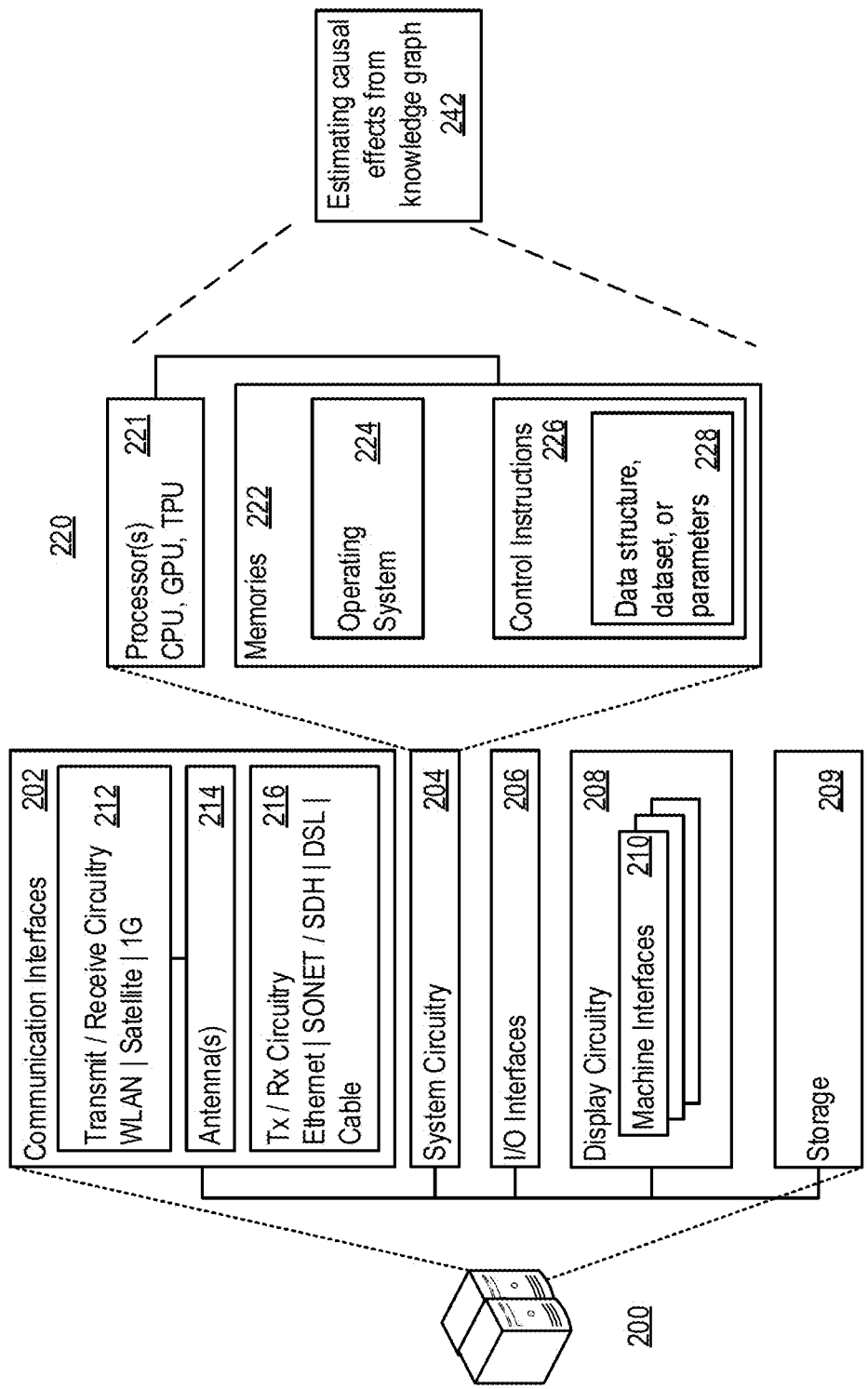
FIG. 2A is a block diagram illustrating an embodiment of a computer architecture for a device for implementing the method in FIG. 1, in accordance with certain embodiments of the present disclosure.

FIG. 2A shows an example execution circuitry for implementing a portion or all of the method 100. In one implementation, the execution circuitry may include a computer system 200 for implementing the method 100. In another implementation, the execution circuitry may include a distributed system including more than one computer systems each of which may include a portion or all of the components as the computer system 200 in FIG. 2A.

Referring to FIG. 2A, the execution circuitry 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CD ROM or DVD drive), serial and parallel bus interfaces, and keyboard and mouse interfaces. The display circuitry 208 may include man-machine interfaces and/or graphical user interfaces (GUI). The GUI may be used to present interfaces and/or options to facilitate model management and/or the execution of other tasks.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol. Additionally or alternatively, the communication interface 202 may support secure information exchanges, such as secure socket layer (SSL) or public-key encryption-based protocols for sending and receiving private data.

The storage 209 may be used to store various initial, intermediate, or final data or model for implementing the method 100 in FIG. 1. These data corpus may alternatively be stored in a database. In one implementation, the storage 209 of the computer system 200 may be integral with the database. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

The system circuitry 204 may support tasks described in the present disclosure, including the drawings and/or claims. In one example, the system circuitry 204 may be implemented as processing circuitry 220 for implementing estimating causal effects from knowledge graphs 242, which may provide software support to implement the various tasks performed in the method 100 of FIG. 1. The processing circuitry 220 may include one or more processors 221 and one or more memories 222. The one or more processors 221 may include a portion or all of the following: one or more central processing unit (CPU), one or more graphics processing unit (GPU), and/or one or more tensor processing unit (TPU). The memories 222 stores, for example, control instructions 226 and an operating system 224. The control instructions 226, for example may include instructions and/or data 228 (e.g., data structure, dataset, and/or parameters) for implementing the task of estimating causal effects. In one implementation, the one or more processors 221 execute the control instructions 226 and the operating system 224 to carry out any desired functionality described in the present disclosure. In another implementation, the one or more processors 221 may include a CPU and multiple GPU/TPU to perform one or more steps in method 100.

Referring to FIG. 2A, the memories 222 may further include applications and structures, for example, coded objects, templates, or one or more other data structures to facilitate model management and/or the execution of other tasks.

Figure 2B:
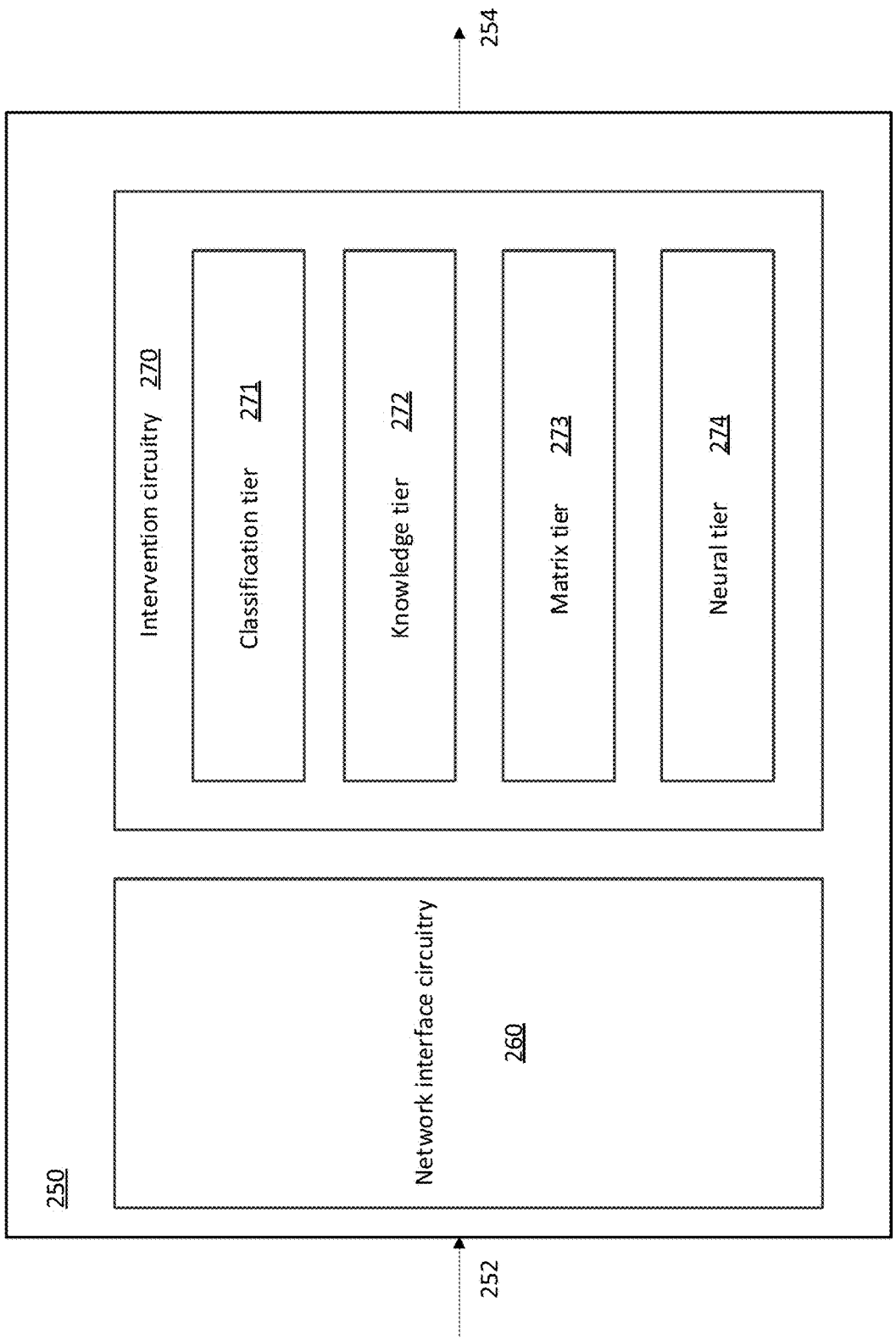
FIG. 2B is a block diagram illustrating an embodiment of a computer device in accordance with certain embodiments of the present disclosure.

Referring to FIG. 2B, a computing device 250 for estimating causal effect from a knowledge graph. The computing device 250 may receive a knowledge graph as input 252 and generate/output an estimated causal effect as output 254. The computing device 250 may include a network interface circuitry 260 and an intervention circuitry 270. The intervention circuitry may be configured to execute an intervention stack, which includes a classification tier 271, a knowledge tier 272, a matrix tier 273, and/or a neural tier 274. The network interface circuitry may include a portion or all of the execution circuitry 200 in FIG. 2A, including a memory storing instructions and a processor in communication with the memory. The intervention circuitry may include a portion or all of the execution circuitry 200 in FIG. 2A, including a memory storing instructions and a processor in communication with the memory.

In some implementations, the network interface circuitry 260 may be configured to obtain intervention application data and obtain subject history data for a candidate group of subjects.

In some implementations, the intervention circuitry 270 may be configured to execute the intervention stack.

At a classification tier of the intervention stack, based on the intervention application data, the intervention circuitry is configured to divide the candidate group into a reception subgroup that received an intervention and a rejected subgroup that did not receive the intervention.

At a knowledge tier of the intervention stack, for each subject within the candidate group, based on the subject history data, the intervention circuitry is configured to map a covariate value set onto a knowledge graph with an embedding neural network, the covariate value set having a modeled functional relationship to selection for intervention.

At a matrix tier of the intervention stack, the intervention circuitry is configured to perform one or more of the following. For each subject in the reception subgroup, translate the covariate value sets for the subjects within the reception subgroup into a reception matrix with a feature neural network. For each subject in the rejection subgroup, translate the covariate value sets for the subjects within the rejection subgroup into a rejection matrix with the feature neural network, compile reception matrices into an intervention matrix, and/or compile rejection matrices into a non-intervention matrix.

At a neural tier of the intervention stack, the intervention circuitry is configured to compare the reception subgroup to the rejection subgroup to determine a differential intervention effect, which may be performed by: for each subject within the candidate group, applying the corresponding reception matrix or the corresponding rejection matrix to a likelihood neural network trained to determine an intervention application likelihood for the subject based on the covariate value set, to obtain an intervention effect, applying the intervention matrix to an effect neural network trained to return an effect for subjects with same intervention application status, to obtain a non-intervention effect, applying the non-intervention matrix to the effect neural network, and/or subtracting the non-intervention effect from the intervention effect with accounting for the intervention application likelihood for the subjects, to obtain the differential intervention effect.

Figure 3A:
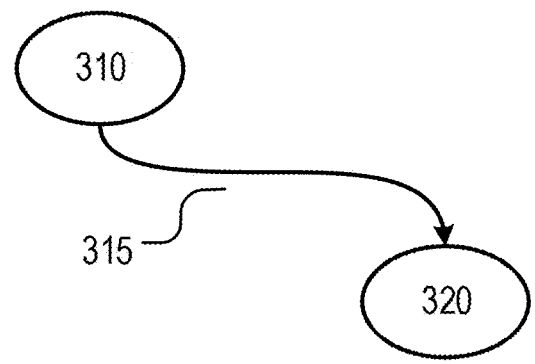
FIG. 3A is a schematic diagram illustrating a knowledge graph schema, in accordance with certain embodiments of the present disclosure.

Referring to FIG. 3A, an example of a knowledge graph may include a first node 310, a second node 320, and a link 315 between the first node 310 and the second node 320. The link 315 may be a predicate. The first and second nodes (310 and 320) may represent associated objects, respectively. The link or predicate may have a directionality pointing from the first object associated with the first node 310 to the second object associated with the second node 320. In one implementation, the nodes may be referred as entities, and/or the link may be referred as relation, predicate, or edge.

Figure 3B:
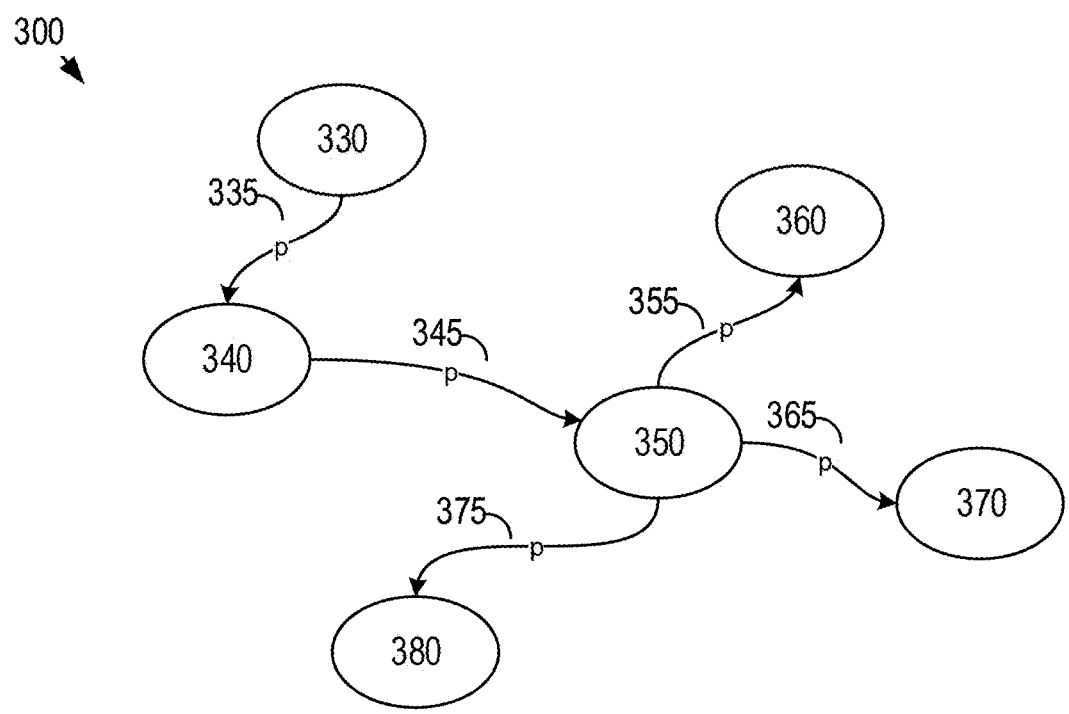
FIG. 3B is a schematic diagram illustrating a knowledge graph schema, in accordance with certain embodiments of the present disclosure.

Referring to FIG. 3B, another example of a knowledge graph 300 may include a plurality of nodes (330, 340, 350, 360, 370, and 380) and a plurality of links or predicates (335, 345, 355, 365, and 375) between the plurality of nodes.

Referring to FIG. 4C, in one implementation, a knowledge graph schema 450 is described as an example in accordance with various embodiments of the present disclosure. The schema may provide a manner to express statements about the resources or knowledge base using specific properties that describe the knowledge base. For example, a resource description framework may provide a data model that represents the knowledge base in expressions of the form subject-predicate-object. In one implementation, the knowledge base may be expressed by graph-based datasets or triples, which includes one subject, one object, and a link or predicate. The link or predicate may include one or more numerical attributes.

In some implementations, the knowledge graph may include a directed acyclic graph (DAG), a resource description framework (RDF), or other knowledge graph type.

Presented as a non-limiting illustrative example, FIG. 4C may show a portion of the knowledge graph, and there may be other portions of the knowledge graph that are not shown in FIG. 4C.

Figure 5:
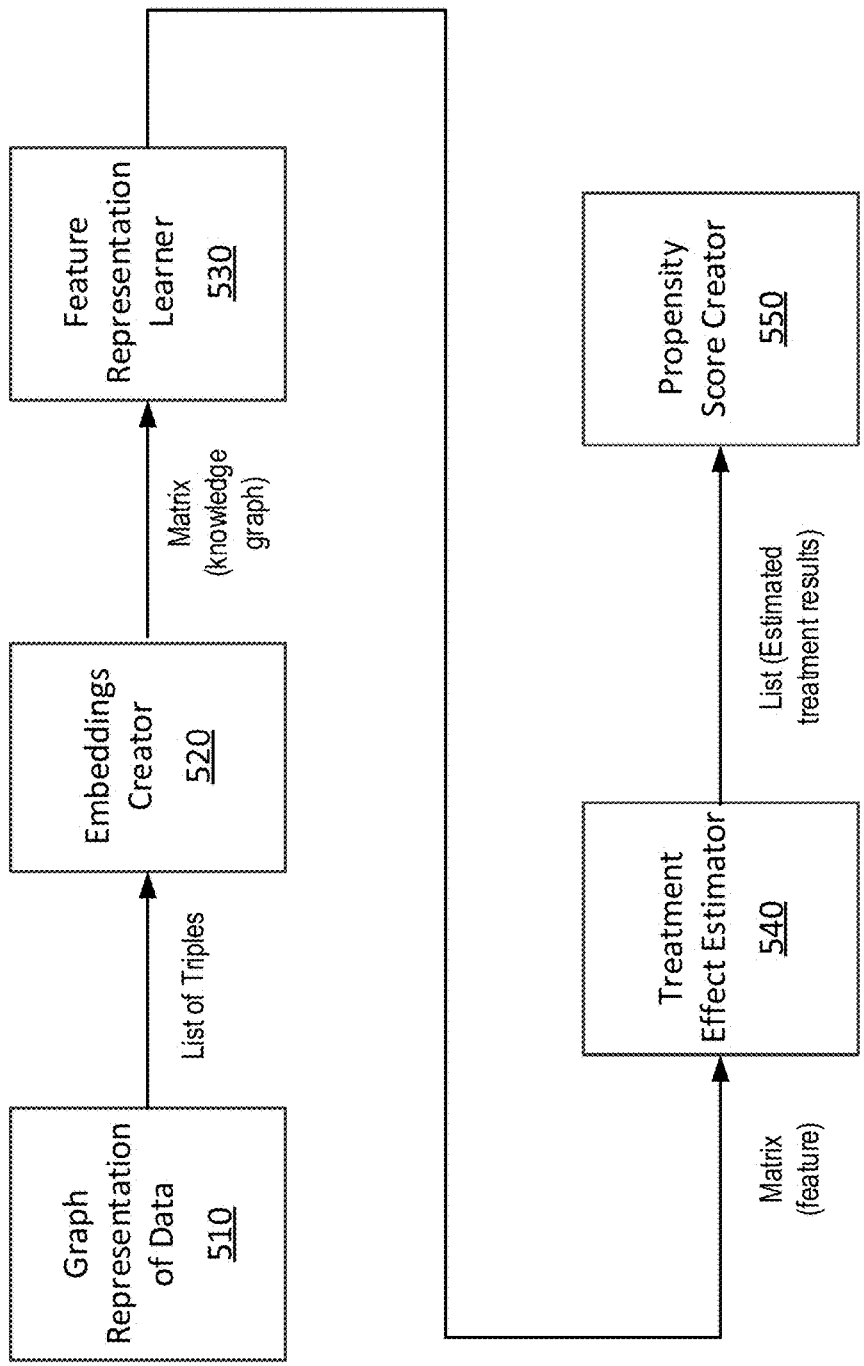
FIG. 5 is a block diagram illustrating an embodiment of a system, in accordance with certain embodiments of the present disclosure.

FIG. 5 shows a schematic diagram for various embodiments in the present disclosure. A system (or pipeline 500) may receive a graph representation of data 510, create propensity scores 550, and/or output the propensity scores. The pipeline 500 may include a portion or all of the following: an embeddings creator 520 to create embeddings, a feature representation learner 530 to learn feature representation, a treatment effect estimator 540 to estimate treatment effects, and/or a propensity score creator 550 to create propensity scores. The system or each sub-system may include corresponding circuitry to perform related functions/steps.

Referring to graph representation of data 510, the data may be represented by a knowledge graph, for example, the knowledge graph 450 in FIG. 4C. The knowledge graph may represent a collection of interlinked descriptions of entities objects, events or concepts, may put data in context via linking and semantic metadata, and/or may provide a framework for data integration, unification, analytics and sharing, some of these features may be unique to knowledge graphs in comparison to a spreadsheet (e.g., CSV file), and/or some of these features may be more easily realizable than a spreadsheet. For example, when a patient was born in a particular city (e.g., City A), a knowledge graph may provide/contain additional information of the City A, for example, but not limited to, climates, demographic information, economic activity, various wealth/income level of the City A. In some implementations, the knowledge graph may grow in size with adding information.

In some implementations, graph representation of data 510 may be constructed/generated either by learning existing information and building a knowledge graph from scratch, or by combine existing information with one or more existing knowledge graph. The knowledge graph may be constructed with and/or supplemented with additional medical history, personal history, family trees. education of parents (e.g., what kind of degree, which school, etc.).

The knowledge graph may serve as an input to the pipeline system, for example, the knowledge graph 450 shows children that were born with a hereditary form of type 2 diabetes.

Figure 6:
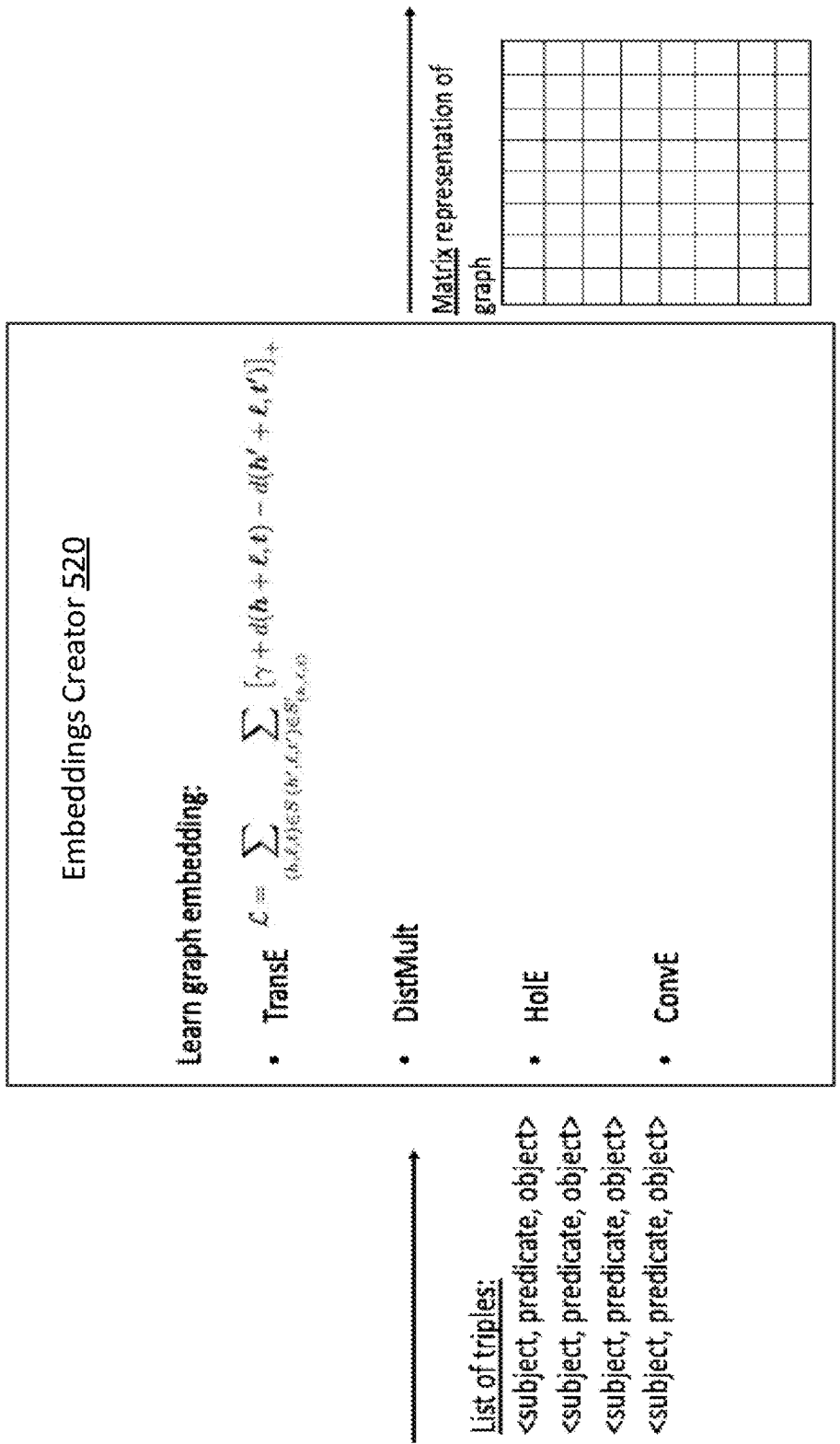
FIG. 6 shows a portion of an embodiment, in accordance with certain embodiments of the present disclosure.

Referring to embeddings creator 520, graph embeddings may be trained, as shown in FIG. 6. Graph embeddings may be the transformation of property graphs to a vector or a set of vectors, wherein embedding may capture the graph topology, vertex-to-vertex relationship, and other relevant information about graphs, sub-graphs, and vertices. The embeddings are trained by passing the graph to the create embeddings module. The graph is represented as a list of triples with the data represented as <subject, predicate, object>, for example, <Susan, born on, January>.

In some implementations, the graph embeddings creator may include a neural network (e.g., an embedding neural network) and/or may be referred as a knowledge graph embedding (KGE) model. The embeddings creator 520 may include an optimizer (e.g., stochastic gradient descent or any variant), a scoring function that assigns plausibility score to a fact (e.g., translating embeddings (TransE), Neural Tensor Network with a diagonal matrix operator (or DistMult), Holographic Embeddings (HolE), Convolutional 2D Knowledge Graph Embeddings (ConvE), or Complex Embeddings (ComplEx) scoring functions), and a loss function that is used to have an objective minimized by the optimizer during training time (e.g., pairwise margin-based, absolute margin, negative log-likelihood, or self-adversarial functions, and etc.). The TransE may be a method that models relationships by interpreting them as translations operation not on the graph structure directly but on a learned low-dimensional embedding of the knowledge graph entities. The DistMult may use a single vector to represent both entity and the relation. The ConvE may correspond to a multi-layer convolutional network model for link prediction. The ComplEx may correspond to a complex embeddings for some link prediction.

For each element (node and/or edge) in the knowledge graph and the target triple, the link prediction sub-system may generate k-size embedding's vector that represents each of the nodes and edges of the input training knowledge graph, wherein k is a positive integer. In one implementation, k may be 100. In another implementation, k may be 400. The knowledge graph (KG) embeddings, generated by the knowledge graph embedding creator/circuitry, may be vectors in the k-dimensional embeddings space.

In some implementations, the embeddings creator may use a neural network model to distinguish true facts from false facts, predict missing facts (missing links in the KG), and/or add the predicted facts into the KG. The KG embeddings may be a compressed, loss, low-dimensional representation (e.g., 100-300 dimensions) of the knowledge graph, for example, some dimensions may correspond to medical history, some other dimensions may correspond to social connections, financial economics, and/or etc.

In some implementations, the embeddings creator 520 may output the KG embeddings, and/or a matrix representation of the knowledge graph. In some implementations, the matrix may correspond to one patient, each row may characterize a piece of patient's information from the knowledge graph (or corresponding to one element in the knowledge graph), and/or each column may be one dimension of the embedding space representing features.

Figure 7:
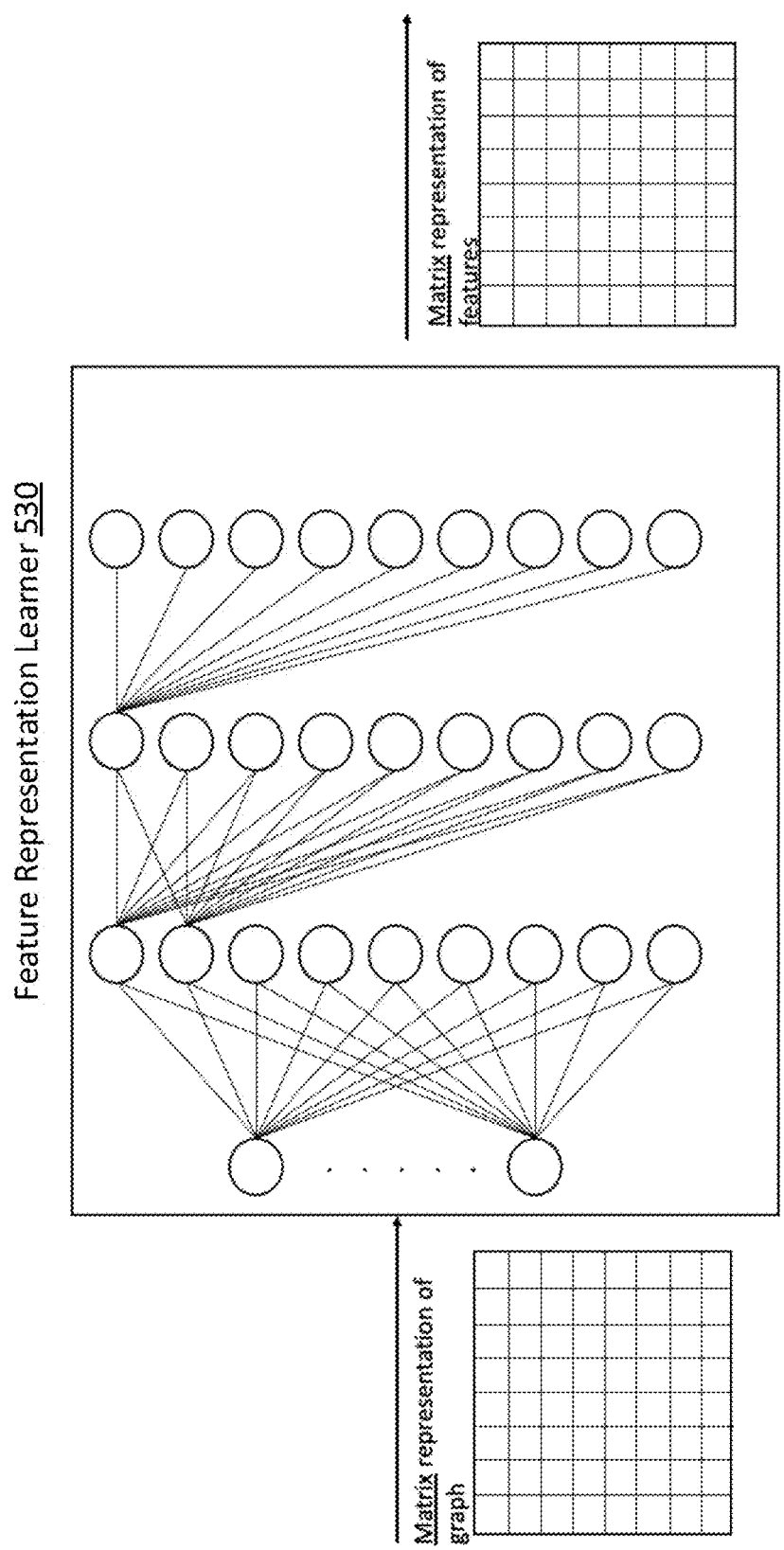
FIG. 7 shows another portion of the embodiment, in accordance with certain embodiments of the present disclosure.

Referring to the feature representation learner 530, the feature representation learner may take the matrix representation of a knowledge graph, learn feature representation, and generate a matrix representation of features as an output, as shown in FIG. 7.

In some implementations, the embeddings for each patient are generated and passed to the feature representation learner, which includes a neural network (e.g., a feature neural network). FIG. 7 shows a schematic representation of a neural network for the feature representation learner.

In the present disclosure, some figures may show a schematic representation of a neural network, which serves as an illustrative representation and does not impose limitations to the neural network. For example, the neural network may include one or more AI machine learning techniques/networks, including but not limited to, a k-means, a term frequency-inverse document frequency (TF-IDF), a random forest, a deep neural network (DNN), and/or a recurrent neural network (RNN). For another example, the architecture of the neural network is not limited to the representation shown in the figures, for example, the sequence/order of various layers and/or a number of types of layers (e.g., convolutional layers, pooling layers, fully-connected layers, etc.).

In some implementations, along with the matrix for each patient, a flag may indicate whether the treatment was administrated to the patient or not. The patent's response to the treatment is also provided. Using a graph allows the model to learn from extra knowledge that can be encoded in a KG. By passing the embeddings to a neural network, a feature representation may be extracted/learned, and this representation allows for features to be learned that help describe each patient.

Figure 8A:
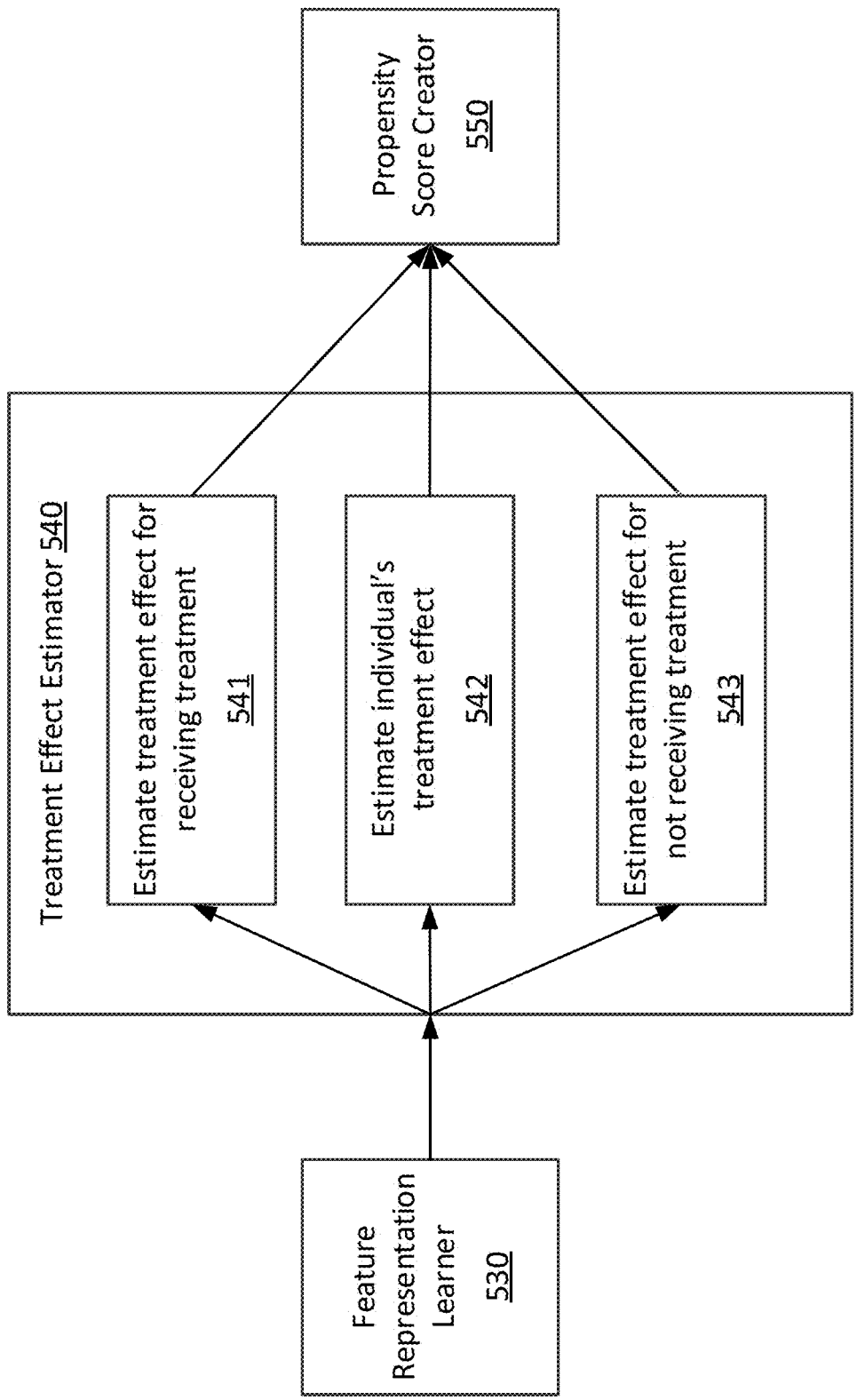
FIG. 8A shows another portion of the embodiment, in accordance with certain embodiments of the present disclosure.

Referring to the treatment effect estimator 540, the treatment effect estimator may estimate treatment effect for patients receiving treatment (541), may estimate treatment effect for patients not receiving treatment (543), and/or may estimate individual's treatment effect (542), as shown in FIG. 8A.

In some implementations, the treatment effect may be estimated according to the trained embeddings. One purpose of treatment effect estimator is to estimate the effectiveness of the diabetes treatment in general as well as estimating a general propensity function for each individual patient to predict how well they would respond.

Figure 8B:
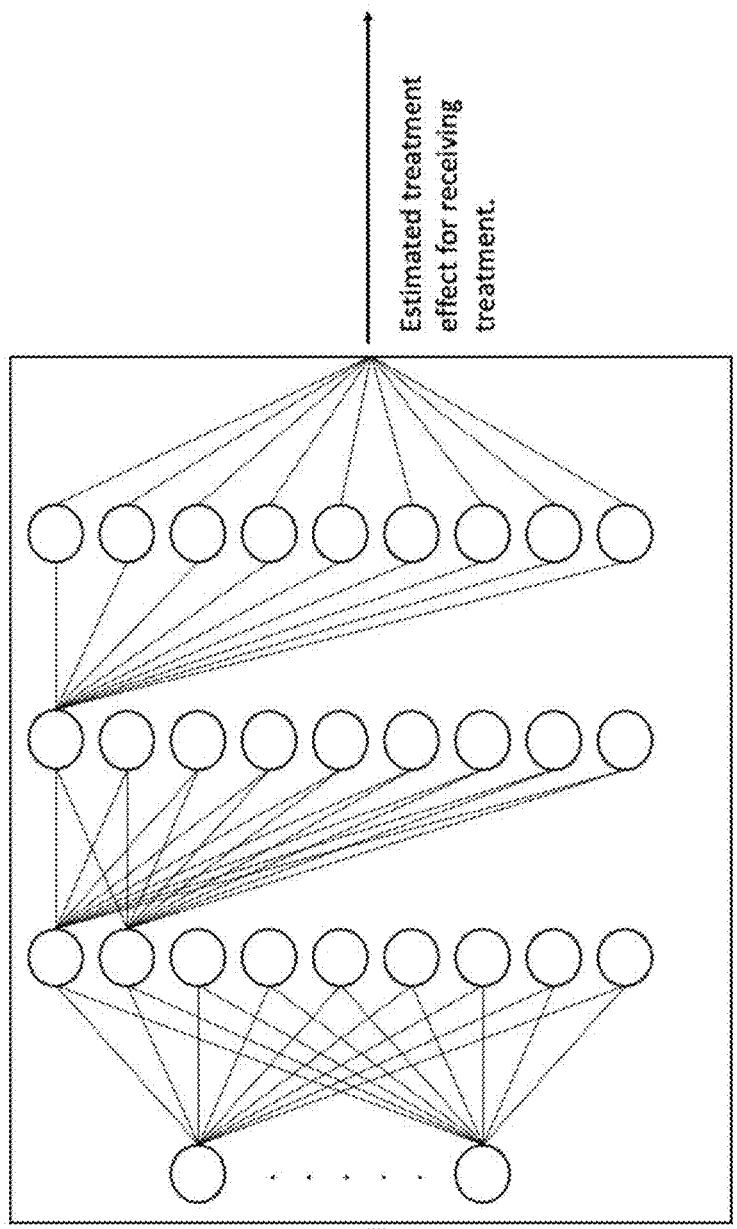
FIG. 8B shows another portion of the embodiment, in accordance with certain embodiments of the present disclosure.

Referring to FIG. 8B, in some implementations to estimate treatment effect for patients receiving treatment 541, a function may be learned to estimate how well patients who were administrated the drug responded. The learned features representations (matrix form) may be generated by the feature representation learner for patients who received the treatment. The matrix representation of the features may be input into a neural network (e.g., an effect neural network) to estimate the average treatment effect for patients receiving the treatment. The patient's recorded responses to the treatment (e.g., diabetes treatment) may be used to train the effect neural network/model. In some implementations, the estimated treatment effect for patients receiving the treatment may be intervention effect.

Figure 8C:
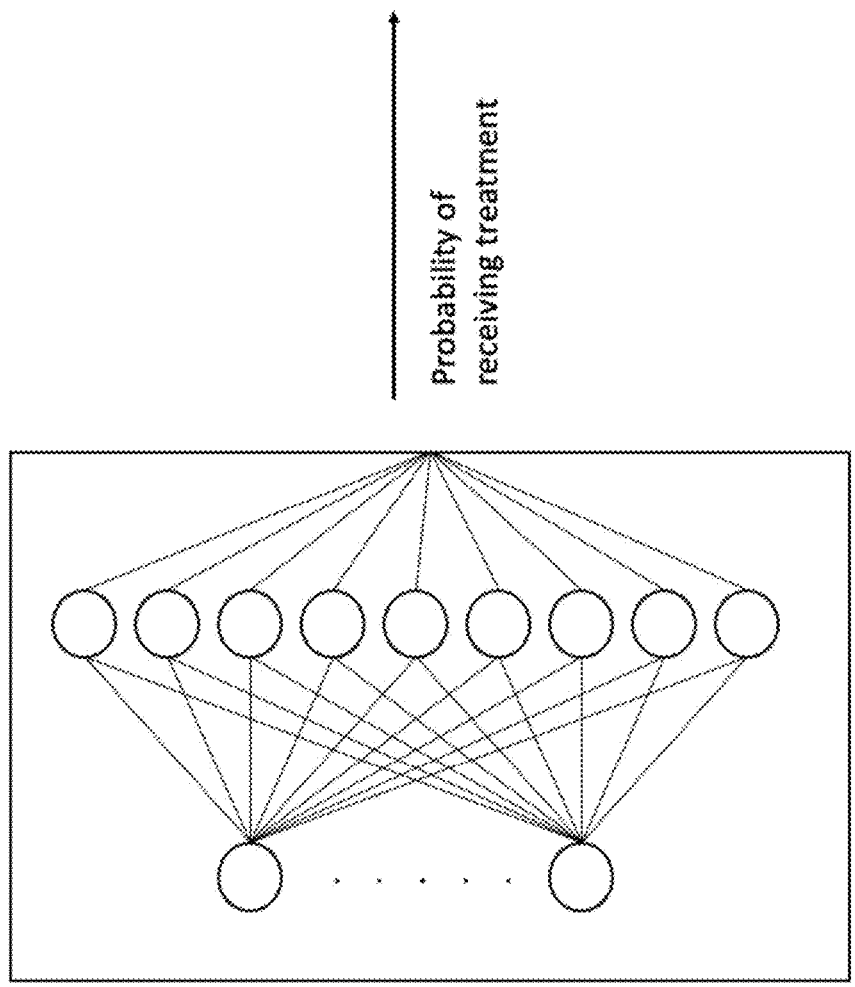
FIG. 8C shows another portion of the embodiment, in accordance with certain embodiments of the present disclosure.
Figure 8D:
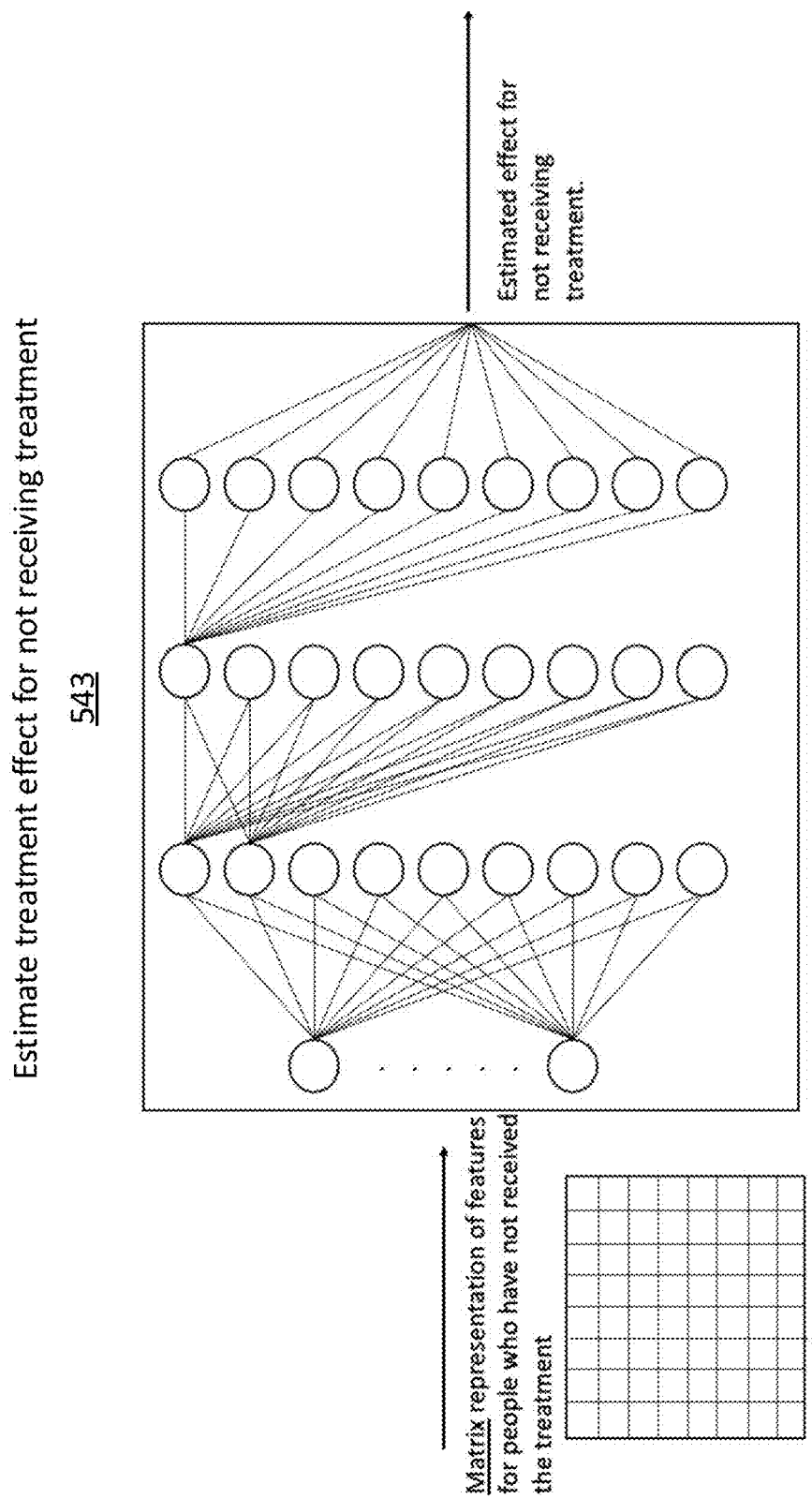
FIG. 8D shows another portion of the embodiment, in accordance with certain embodiments of the present disclosure.

Referring to FIG. 8D, in some implementations to estimate treatment effect for patients not receiving treatment 543, a similar function may be used to estimate the average patient response for patients not receiving the treatment. The learned feature representations (matrix form) for patients who did not received the treatment may be selected. The matrix representation of the features may be input into the neural network (e.g., the effect neural network) to estimate the average treatment effect for patients not receiving the treatment. The patient's recorded responses to the treatment (e.g., diabetes treatment) may be used to train the effect neural network/model. In some implementations, the estimated treatment effect for patients not receiving the treatment may be non-intervention effect.

Referring to FIG. 8C, in some implementations to estimate individual's treatment effect 542, another function may be learned to estimate how any given individual might respond to the treatment. All patient data may be used and a regression model may be trained to estimate an individual's propensity score. In some implementation, a neural network (e.g., a likelihood neural network) may be used to estimate how any given individual might respond to the treatment, or determine an intervention application likelihood for a patient based on the knowledge graph embeddings for the patient. In some implementations, the model/neural network in FIG. 8C may be used to predict whether an individual should be recommended to receive the treatment or not.

Figure 9:
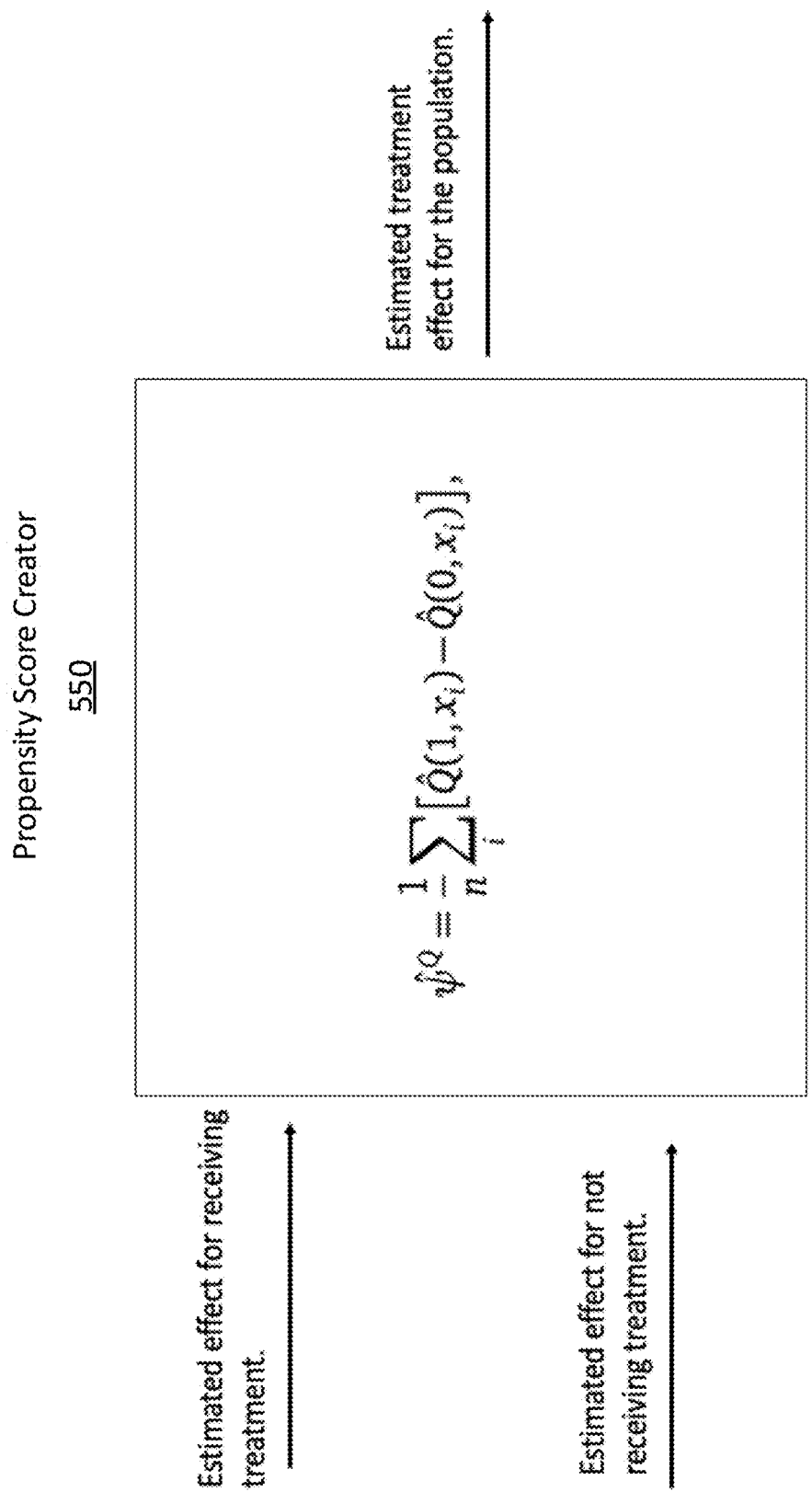
FIG. 9 shows another portion of the embodiment, in accordance with certain embodiments of the present disclosure.

Referring to the propensity score creator 550, the propensity score creator may receive, as inputs, the estimated treatment effect for receiving the treatment and the estimated treatment effect for not receiving the treatment, as shown in FIG. 9. The propensity score creator may include one or more functions used to create the estimated treatment effect for the general population, which may be used to indicate how well the treatment works. One exemplary equation includes the function of Equation 1.

$$\hat{\psi}^Q = \frac{1}{n} \sum_i [\hat{Q}(1, x_i) - \hat{Q}(0, x_i)]$$ (Equation 1)

wherein $x_i$ is considered as the patient, $\hat{Q}(1, x_i)$ corresponds to the estimated effect for receiving treatment, $\hat{Q}(0, x_i)$ corresponds to the estimated effect for not receiving treatment, and $\hat{\psi}^Q$ corresponds to the estimated treatment effect for the general population, which may be used to indicate how well the treatment works.

In some implementations, the probability (or likelihood) of receiving treatment for each patient may be fed into the propensity score creator. While controlling for intervention application likelihoods for individual subject, the propensity score creator may subtract the non-intervention effect from the intervention effect to obtain the differential intervention effect. In some implementations, while accounting for intervention application likelihoods for individual subject, the propensity score creator may subtract the non-intervention effect from the intervention effect to obtain the differential intervention effect. Giving that all confounding variables may be accounted for, the response difference (or differential intervention effect) for individuals who received the treatment and who have not should be the treatment itself.

Various embodiments in the present disclosure may include estimating the treatment effects using a knowledge graph structure instead of tabular data, and/or expanding the knowledge graph to allow for more accurate estimates of the treatment effect by capturing additional confounding and/or latent variables. One of the advantages with using knowledge graphs may be that all of the patient information along with other features such as sociopolitical information may be represented in a larger knowledge graph, accounting for confounding variables.

Various embodiments in the present disclosure may include one or more models/neural networks, which are trained to determine an average treatment effect for the population and/or an individual propensity score for recommending an individual for the treatment. The individual propensity score may be used to determine whether or not the treatment should be applied, and may give an estimation/indication of how effective the predetermined medicines/treatment would be to the individual and the population. For example, with a patient, various embodiments may include applying, to the effect neural network, a current status matrix of the patient to obtain a forecasted intervention effect for the patient; comparing the forecasted intervention effect to the differential intervention effect; and/or in response to the forecasted intervention effect exceeding the differential intervention effect, output an indication for recommending the treatment to the patient. By accounting for causal effects and confounding variables, the effect and impact of the treatment on individuals may be confidently reported.

In the present disclosure, in some or all embodiments, a knowledge graph may refer to a set of entities and relations (or links) between these entities represented as a graph. A knowledge graph embedding may refer to an optimized set of vectors representing entities and links of a knowledge graph.

In the present disclosure, any steps or operations in various embodiments may be combined in any amount or in any order, as desired. In the present disclosure, two or more steps or operations in various embodiments may be performed in parallel.

In the present disclosure, when applicable, an entire system or one or more component of the system may include one or more AI machine learning techniques/networks, including but not limited to, a k-means, a term frequency-inverse document frequency (TF-IDF), a random forest, a deep neural network (DNN), and/or a recurrent neural network (RNN).

In the present disclosure, an entire system or one or more component of the system, for example, a "stack" in an intervention stack, or a "tier" in a classification tier, or a unit, or a module, may include one or more software unit, one or more hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a random access memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A computing device for estimating causal effects from knowledge graphs, the computing device comprising:
   a network interface circuitry configured to obtain intervention application data and obtain subject history data stored in a database for a candidate group of subjects; and
   an intervention circuitry configured to execute an intervention stack, wherein:
      at a classification tier of the intervention stack, based on the intervention application data, the intervention circuitry is configured to divide the candidate group into a reception subgroup that received an intervention and a rejected subgroup that did not receive the intervention;
      at a knowledge tier of the intervention stack, for each subject within the candidate group, based on the subject history data, the intervention circuitry is configured to map a covariate value set onto a knowledge graph with an embedding neural network, the covariate value set having a modeled functional relationship to selection for intervention;
      at a matrix tier of the intervention stack, the intervention circuitry is configured to:
         for each subject in the reception subgroup, translate the covariate value sets for the subjects within the reception subgroup into a reception matrix with a feature neural network,
         for each subject in the rejection subgroup, translate the covariate value sets for the subjects within the rejection subgroup into a rejection matrix with the feature neural network,
         compile reception matrices into an intervention matrix, and
         compile rejection matrices into a non-intervention matrix; and
      at a neural tier of the intervention stack, the intervention circuitry is configured to compare the reception subgroup to the rejection subgroup to determine a differential intervention effect by:
         for each subject within the candidate group, applying the corresponding reception matrix or the corresponding rejection matrix to a likelihood neural network trained to determine an intervention application likelihood for the subject based on the covariate value set,
         to obtain an intervention effect, applying the intervention matrix to an effect neural network trained to return an effect for subjects with same intervention application status,
         to obtain a non-intervention effect, applying the non-intervention matrix to the effect neural network, and
         subtracting the non-intervention effect from the intervention effect with accounting for the intervention application likelihood for the subjects, to obtain the differential intervention effect.

2. The computing device of claim 1, wherein the likelihood neural network and the effect neural network are included within a single neural network.

3. The computing device of claim 1, wherein:
   the knowledge graph includes an edge that extends from a first node representing a first entity to a second node representing a second entity; and
   the edge represents at least one of the following: a child relationship, a descendant relationship, or an association relationship between the first node and the second node.

4. The computing device of claim 1, wherein the knowledge graph comprises one of the following: a directed acyclic graph (DAG), or a resource description framework (RDF).

5. The computing device of claim 1, wherein the intervention comprises a medical treatment.

6. The computing device of claim 1, wherein the subject history data comprises an indication of one or more symptoms present at a time of intervention application determination for the subjects in the candidate group.

7. The computing device of claim 1, wherein, at the neural tier of the intervention stack, the intervention circuitry is further configured to:
   apply, to the effect neural network, a current status matrix of a test subject with a pending intervention determination to obtain a forecasted intervention effect for the test subject;
   compare the forecasted intervention effect to the differential intervention effect; and
   in response to the forecasted intervention effect exceeding the differential intervention effect, output an indication for the intervention for the test subject.

8. A method for estimating causal effects from knowledge graphs, the method comprising:
   obtaining, by a network interface circuitry, intervention application data and subject history data stored in a database for a candidate group of subjects;

dividing, by an intervention circuitry based on the intervention application data, the candidate group into a reception subgroup that received an intervention and a rejected subgroup that did not receive the intervention;

for each subject within the candidate group, mapping, by the intervention circuitry based on the subject history data, a covariate value set onto a knowledge graph with an embedding neural network, the covariate value set having a modeled functional relationship to selection for intervention;

for each subject in the reception subgroup, translating, by the intervention circuitry, the covariate value sets for the subjects within the reception subgroup into a reception matrix with a feature neural network;

for each subject in the rejection subgroup, translating, by the intervention circuitry, the covariate value sets for the subjects within the rejection subgroup into a rejection matrix with the feature neural network;

compiling, by the intervention circuitry, reception matrices into an intervention matrix;

compiling, by the intervention circuitry, rejection matrices into a non-intervention matrix; and comparing, by the intervention circuitry, the reception subgroup to the rejection subgroup to determine a differential intervention effect by:

for each subject within the candidate group, applying the corresponding reception matrix or the corresponding rejection matrix to a likelihood neural network trained to determine an intervention application likelihood for the subject based on the covariate value set, applying the intervention matrix to an effect neural network trained to return an effect for subjects with same intervention application status, to obtain an intervention effect, applying the non-intervention matrix to the effect neural network, to obtain a non-intervention effect, and subtracting the non-intervention effect from the intervention effect with accounting for the intervention application likelihood for the subjects, to obtain the differential intervention effect.

9. The method of claim 8, wherein the likelihood neural network and the effect neural network are included within a single neural network.

10. The method of claim 8, wherein:
the knowledge graph includes an edge that extends from a first node representing a first entity to a second node representing a second entity; and
the edge represents at least one of the following: a child relationship, a descendant relationship, or an association relationship between the first node and the second node.

11. The method of claim 8, wherein the knowledge graph comprises one of the following: a directed acyclic graph (DAG), or a resource description framework (RDF).

12. The computing device of claim 1, wherein the intervention comprises a medical treatment.

13. The method of claim 8, wherein the subject history data comprises an indication of one or more symptoms present at a time of intervention application determination for the subjects in the candidate group.

14. The method of claim 8, further comprising:
applying, to the effect neural network, a current status matrix of a test subject with a pending intervention determination to obtain a forecasted intervention effect for the test subject;

comparing the forecasted intervention effect to the differential intervention effect; and in response to the forecasted intervention effect exceeding the differential intervention effect, outputting an indication for the intervention for the test subject.

15. A non-transitory computer-readable storage medium storing computer-readable instructions, wherein, the computer-readable instructions, when executed by a processor, are configured to cause the processor to perform:

obtaining intervention application data and subject history data stored in a database for a candidate group of subjects;

dividing, based on the intervention application data, the candidate group into a reception subgroup that received an intervention and a rejected subgroup that did not receive the intervention;

for each subject within the candidate group, mapping, based on the subject history data, a covariate value set onto a knowledge graph with an embedding neural network, the covariate value set having a modeled functional relationship to selection for intervention;

for each subject in the reception subgroup, translating the covariate value sets for the subjects within the reception subgroup into a reception matrix with a feature neural network;

for each subject in the rejection subgroup, translating the covariate value sets for the subjects within the rejection subgroup into a rejection matrix with the feature neural network;

compiling reception matrices into an intervention matrix;
compiling rejection matrices into a non-intervention matrix; and comparing the reception subgroup to the rejection subgroup to determine a differential intervention effect by:

for each subject within the candidate group, applying the corresponding reception matrix or the corresponding rejection matrix to a likelihood neural network trained to determine an intervention application likelihood for the subject based on the covariate value set, applying the intervention matrix to an effect neural network trained to return an effect for subjects with same intervention application status, to obtain an intervention effect, applying the non-intervention matrix to the effect neural network, to obtain a non-intervention effect, and subtracting the non-intervention effect from the intervention effect with accounting for the intervention application likelihood for the subjects, to obtain the differential intervention effect.

16. The non-transitory computer-readable storage medium according to claim 15, wherein the likelihood neural network and the effect neural network are included within a single neural network.

17. The non-transitory computer-readable storage medium according to claim 15, wherein:
the knowledge graph includes an edge that extends from a first node representing a first entity to a second node representing a second entity; and
the edge represents at least one of the following: a child relationship, a descendant relationship, or an association relationship between the first node and the second node.

18. The non-transitory computer-readable storage medium according to claim 15, wherein the knowledge graph comprises one of the following: a directed acyclic graph (DAG), or a resource description framework (RDF).

19. The non-transitory computer-readable storage medium according to claim 15, wherein the intervention comprises a medical treatment.

20. The non-transitory computer-readable storage medium according to claim 15, wherein the subject history data comprises an indication of one or more symptoms present at a time of intervention application determination for the subjects in the candidate group.

* * * * *